Nov. 27, 1928.  1,693,235
E. A. ILEMAN
METHOD OF MOUNTING PRESSURE GAUGE DIAPHRAGMS
Filed May 21, 1926

Inventor
Emil A. Ileman
By his Attorneys
Ward, Crosby & Smith

Patented Nov. 27, 1928.

1,693,235

UNITED STATES PATENT OFFICE.

EMIL A. ILEMAN, OF NEW YORK, N. Y., ASSIGNOR, BY MESNE ASSIGNMENTS, TO CONSOLIDATED ASHCROFT HANCOCK COMPANY, INC., OF NEW YORK, N. Y., A CORPORATION OF DELAWARE.

METHOD OF MOUNTING PRESSURE-GAUGE DIAPHRAGMS.

Application filed May 21, 1926. Serial No. 110,599.

My invention relates to improvements in methods of mounting diaphragms for pressure gauges. The main object of the invention is to provide a method and mounting of diaphragms for pressure gauges whereby the diaphragm is rendered more accurate and efficient in operation.

Further and more specific objects, features and advantages will more clearly appear from the detail description given below taken in connection with the accompanying sheet of drawings which form a part of this specification.

Figure 1:
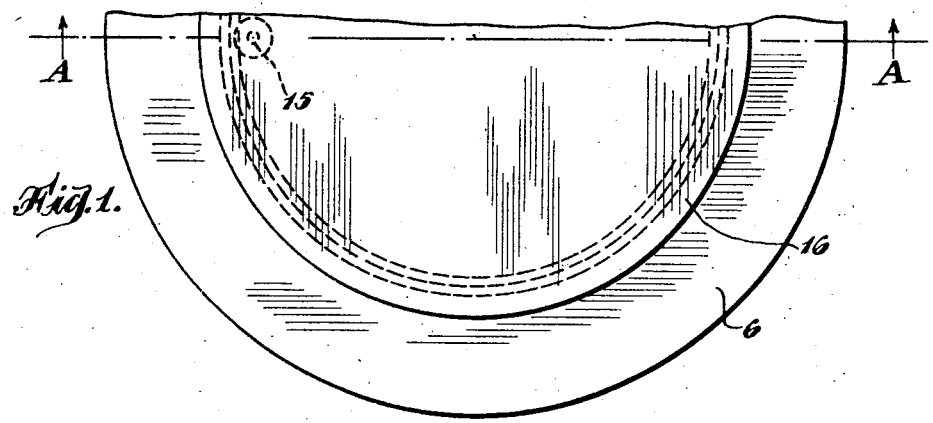
Figure 2:
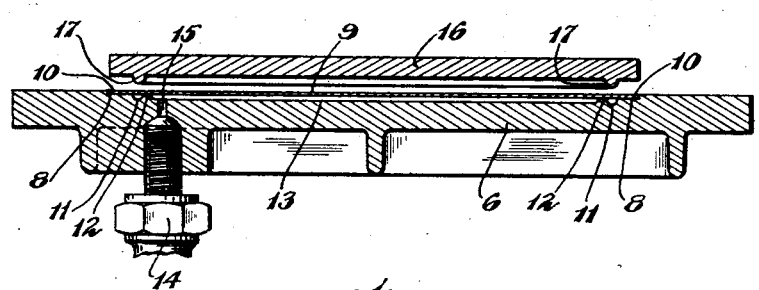
Figure 3:
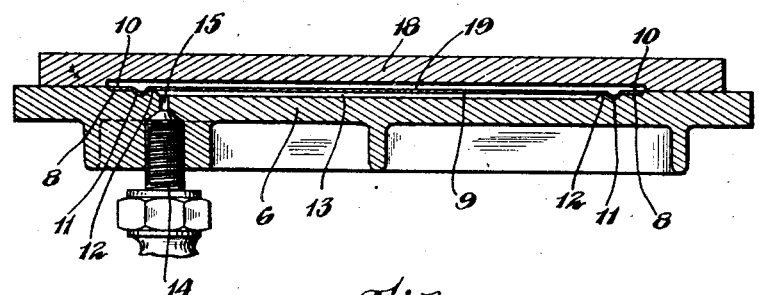

In the drawings, Fig. 1 is a partial plan view of a base member with the diaphragm secured thereto and a die plate above the diaphragm in a position to operate upon the same. Fig. 2 is a section taken on the line A—A of Fig. 1. Fig. 3 is a similar section with the die plate removed and another plate in position over the diaphragm.

Referring to the drawings, 6 represents a base member or plate which is to be used in the pressure gauge for holding the diaphragm. The plate is provided with a circular rabbet at 8 and fitted within the rabbeted portion is a circular sheet metal diaphragm 9. The diaphragm 9 has substantially plane surfaces, that is, it is substantially flat and non-corrugated and it is preferably rigidly secured to the base member 6 entirely around its periphery at 10 as by soldering, welding or the like. Inside of the periphery of the diaphragm 9 the plate 6 is provided with a circular groove 11 and just inside of the circular groove 11 the plate 6 is provided with a circular rib 12 while inside of the circular rib 12 the space is provided with a shallow recess portion 13. 14 represents a pipe fitting through which air or other fluid under pressure may be introduced into the space 13 underneath the diaphragm through a hole 15.

After the diaphragm has been soldered or otherwise secured to the plate 6 around the periphery of the diaphragm at 10, it is found that generally the diaphragm is irregular and would be unstable in operation. Therefore I apply thereto a die 16 provided on its underneath side with a circular rib 17 adapted to cooperate with and fit the groove 11 as shown in Fig. 2. The die 16 is forced against the diaphragm thereby forcing the metal of the diaphragm into the groove 11. This takes out irregularities in the diaphragm and stretches and tensions the same. The die 16 is then removed whereupon the diaphragm remains positioned on the base member 6 with the body portion thereof held more or less tensioned and stretched over the circular rib 12 with all slack in the diaphragm taken out. Then the plate 18 is clamped to the plate 6 as shown in Fig. 3. The plate 6 is provided with a shallow recess at 19 opposite the diaphragm and after the plate 18 has been thus firmly secured in position, air under pressure is introduced through the fitting 14 and hole 15, the space 13 underneath the diaphragm and the diaphragm forced and bulged outwardly until it engages the surface of the plate 18 at the bottom of the recess 19. The recess 19 is slightly deeper than the maximum position of the diaphragm under any pressures it will be subjected to in normal operation of the gauge. Thus fluid pressure in excess of the maximum pressure to be applied to the diaphragm, is applied to the diaphragm between it and the base member sufficient to bulge the diaphragm slightly in excess of the amount that it would be bulged in normal operation. The surface of the recess 19 which is thus at a distance slightly greater than the distance the diaphragm will be moved in that direction in normal operation, acts as a stop to the diaphragm to prevent the diaphragm from being bulged too far under excessive pressure. With the plate 18 still in position the pressure is relieved and preferably applied again several times after which the plate 18 is removed and the diaphragm, fixed to the base member 6, is ready for assembling in the pressure gauge.

The plate 6 with the diaphragm thus mounted thereon may be assembled in the gauge in any suitable manner with any suitable indicating mechanism whereby fluid under pressure introduced into the space 13 between the diaphragm and the base plate 6 will cause the diaphragm to be bulged and operate any suitable indicating mechanism to measure or indicate the pressure applied. Preferably, however, I provide in the gauge a spring which acts on the central part of the diaphragm to force the same down into the recess 13 so that the pressure of the fluid introduced into the space 13, acting in opposition to the spring, first forces the diaphragm to its normal position as shown in Fig. 3 and then bulges the same outwardly slightly as the pressure is increased to the maximum operating pressure, as described in detail in my co-pending application Ser. No. 110,598 filed May 21, 1926.

By applying the plate 18 and then introducing fluid under pressure into space 13 to bulge the diaphragm into the recess 19, the diaphragm becomes treated and conditioned so that when put into the gauge, its readings become uniform.

While I have described my improvements in detail and with respect to a preferred form thereof, I do not desire to be limited to such details or form since many changes and modifications may be made and the invention embodied in widely different forms without departing from the spirit and scope thereof in its broader aspects; hence, I desire to cover all modifications and forms coming within the language or scope of any one or more of the appended claims.

What I claim as new and desire to secure by Letters Patent is:

1. The method of mounting pressure gauge diaphragms which consists in providing a base member, securing a sheet metal diaphragm to the base member around the periphery of the diaphragm, the base member having a circular groove therein inside the periphery of the diaphragm, and forcing the metal of the diaphragm into said groove to take out irregularities in the diaphragm.

2. The method of mounting pressure gauge diaphragms which consists in providing a base member, securing a sheet metal diaphragm to the base member around the periphery of the diaphragm, the base member having a circular groove therein adjacent but inside the periphery of the diaphragm, and forcing the metal of the diaphragm into said groove to take out irregularities in the diaphragm, and finally applying fluid pressure to the diaphragm between it and the base member, sufficient to bulge the diaphragm in excess of the amount it will be bulged in normal operation.

3. The method of mounting pressure gauge diaphragms, which consists in providing a base member to be used in the gauge, securing a substantially flat sheet metal diaphragm to the base member around the periphery of the diaphragm, applying a die which forms a groove in the diaphragm inside the periphery thereof to put the diaphragm under tension and take out irregularities therein.

4. The method of mounting pressure gauge diaphragms, which consists in providing a base member to be used in the gauge, securing a substantially flat sheet metal diaphragm to the base member around the periphery of the diaphragm, applying a die which forms a groove in the diaphragm inside the periphery thereof to put the diaphragm under tension and take out irregularities therein, then fixing over the diaphragm on the opposite side thereof from the base member, a surface, at a distance from the diaphragm slightly greater than the distance the diaphragm will be moved in that direction in normal operation and applying fluid under pressure between the diaphragm and base member to force the diaphragm into contact with said surface which acts as a stop therefor.

5. The method of mounting pressure gauge diaphragms, which consists in providing a base member to be used in the gauge, securing a substantially flat sheet metal diaphragm to the base member around the periphery of the diaphragm, applying a die which forms a groove in the diaphragm inside the periphery thereof to put the diaphragm under tension and take out irregularities therein, then fixing over the diaphragm on the opposite side thereof from the base member, a surface, at a distance from the diaphragm slightly greater than the distance the diaphragm will be moved in that direction in normal operation, and finally applying fluid pressure to the diaphragm between it and the base member, sufficient to bulge the diaphragm in excess of the amount it will be bulged in normal operation.

6. The method of mounting pressure gauge diaphragms which consists in providing a base member with a shallow recess in the face thereof and a circular groove on the outside of said recess, securing a substantially flat sheet metal diaphragm to said base member entirely around the periphery of the diaphragm and outside of said groove, and applying a die which forces the metal of the diaphragm into the groove to tension the diaphragm.

7. The method of mounting pressure gauge diaphragms which consists in providing a base member with a shallow recess in the face thereof and a circular groove on the outside of said recess, securing a substantially flat sheet metal diaphragm to said base member entirely around the periphery of the diaphragm and outside of said groove, and applying a die which forces the metal of the diaphragm into the groove to tension the diaphragm, and finally applying fluid pressure to the diaphragm between it and the base member, sufficient to bulge the diaphragm in excess of the amount it will be bulged in normal operation.

8. The method of mounting pressure gauge diaphragms which consists in providing a base member with a shallow recess in the face thereof and a circular groove on the outside of said recess, securing a sheet metal diaphragm to said base member entirely around the periphery of the diaphragm and outside of said groove, and applying a die which forces the metal of the diaphragm into the groove to tension the diaphragm, then fixing over the diaphragm on the opposite side thereof from the base member, a surface, at a distance from the diaphragm slightly greater than the distance the diaphragm will be moved in that direction in normal operation and applying fluid under pressure between the diaphragm and base member to force the diaphragm into contact with said surface which acts as a stop therefor.

In testimony whereof I have signed my name to this specification.

EMIL A. ILEMAN.